United States Patent [19]

Goodwin

[11] 4,023,532
[45] May 17, 1977

[54] FACE FLY DEVICE

[76] Inventor: Roy Goodwin, Rte. 2, Lancaster, Mo. 63548

[22] Filed: Apr. 22, 1976

[21] Appl. No.: 679,471

[52] U.S. Cl. .................................. 119/156; 119/157
[51] Int. Cl.² .......................................... A01K 29/00
[58] Field of Search ............ 119/156, 157; 431/301, 431/320; 239/49, 50

[56] References Cited
UNITED STATES PATENTS 2,777,421  1/1957  Hiebert ............................... 119/157
3,213,830  10/1965  Wiesemann ..................... 119/157 X Primary Examiner—Hugh R. Chamblee
Attorney, Agent, or Firm—Zarley, McKee, Thomte, Voorhees & Sease

[57] ABSTRACT

A face fly device comprises a container having a compartment area provided therein for receiving an insecticide mixed with oil or diesel fuel. A pair of flaps are provided on the upper end of the container which are riveted to the lobe of an animal's ear. A flexible wick extends downwardly from the container and is positioned adjacent the animal's face. The wick includes a knot which is positioned within the container so that the insecticide will flow through the wick from the interior of the container to the exterior of the container. The knot restricts the flow so as to prevent the insecticide from being depleted quickly.

6 Claims, 7 Drawing Figures

FACE FLY DEVICE

BACKGROUND OF THE INVENTION

This invention relates to a face fly device and more particularly, to a container which is secured to an animal's ear and which has a wick means extending downwardly adjacent the animal's face.

Face flies are troublesome and annoying to animal's, and often, the animal's eyes become infected as the result of irritation from face flies. Many devices have been used in an effort to eliminate the face fly problem, but none of the devices adequately or efficiently transfers insecticide or the like to the animal's face so that face flies will be repelled thereby.

A face fly device similar to the present invention is shown in U.S. Pat. No. 3,935,839 dated Feb. 3, 1976, and this face fly device utilized a wick means extending downwardly adjacent the animal's face. The wick means shown in this patent, however, causes the fluid within the container to be depleted in a very short time. This is for the reason that the fluid flows more quickly than needed through the wick, and consequently, the reservoir within the container is quickly depleted.

The present invention improves upon the device shown in U.S. Pat. No. 3,935,839 by utilizing a knot in the wick positioned adjacent the opening in the container wall so as to restrict the flow of fluid through the wick, while at the same time permitting the exterior portion of the wick to remain damp with the insecticide fluid.

Therefore, a primary object of the present invention is the provision of an improved face fly device which utilizes a wick capable of restricting the flow of fluid so that the repellant solution within the container will last for a long period of time.

A further object of the present invention is the provision of a device which may be fastened to an animal's head so that the wick having the insecticide thereon will dangle adjacent the animal's face.

A further object of the present invention is the provision of a device which is economical to manufacture and durable in use.

These and other objects will be apparent to those skilled in the art.

DESCRIPTION OF THE PREFERRED EMBODIMENT

Figure 1:
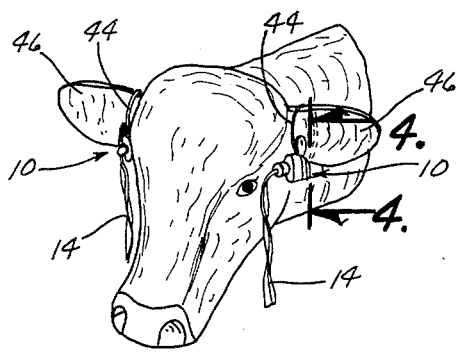
FIG. 1 is a perspective view of an animal's head having a pair of the devices of this invention mounted on the ears thereof

The face fly device of this invention is referred to generally by the reference numeral 10 and comprises generally a container 12 having a wick 14 extending outwardly therefrom. Container 12 comprises opposite ends 16, 18, upper and lower sides, 20, 22, and front and rear face portions 24, 26.

Formed in end wall 18 is a threaded neck 28 forming an annular opening 30 for communication between the interior and exterior of container 12. Threaded over neck 28 is a threaded cap 32 having a slot opening 34 therein.

Figure 6:
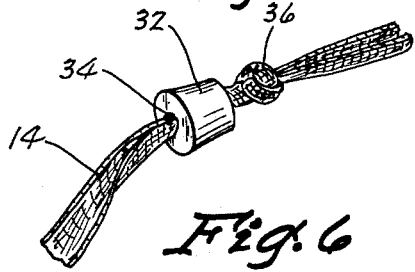
FIG. 6 is a perspective view of the cap and wick utilized in the present invention.

Wick 14 is a rectangular cloth material similar in configuration to wicks used in conventional oil lamps. As shown in FIG. 6, wick 14 is folded along its longitudinal length to a double thickness prior to the tying of a knot 36. After knot 36 is tied in wick 14, the wick is exposed to a tension of approximately 50 pounds so as to tighten knot 36 to the desired tightness. Wick 14 is then threaded through slot 34 which is sized to provide a restricted opening for wick 14.

Figure 7:
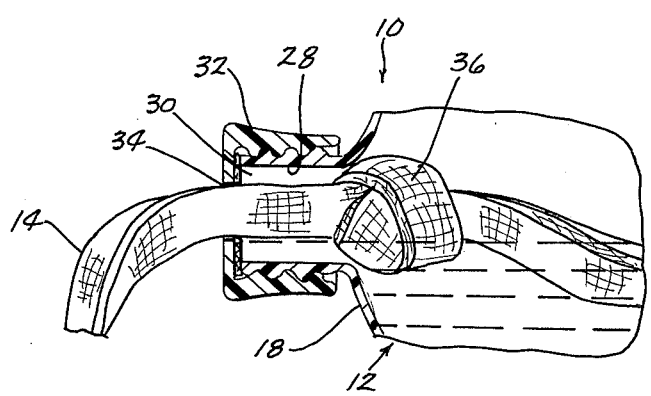
FIG. 7 is an enlarged sectional view of the wick and the cap when in the operative position with respect to the container.

Knot 36 is then forced through annular opening 30 into the interior of container 12. Wick 14 is then tugged until knot 36 abuts against the annular margins of opening 30, a shown in FIG. 7.

Extending around the exterior of container 12 are a pair of securing bands 38 (such as tape or the like) and these bands secure a pair of U-shaped tabs 40, 42 along upper side 20 of container 12. A tie element 44 is also secured to container 12 by means of securing bands 38.

Figure 4:
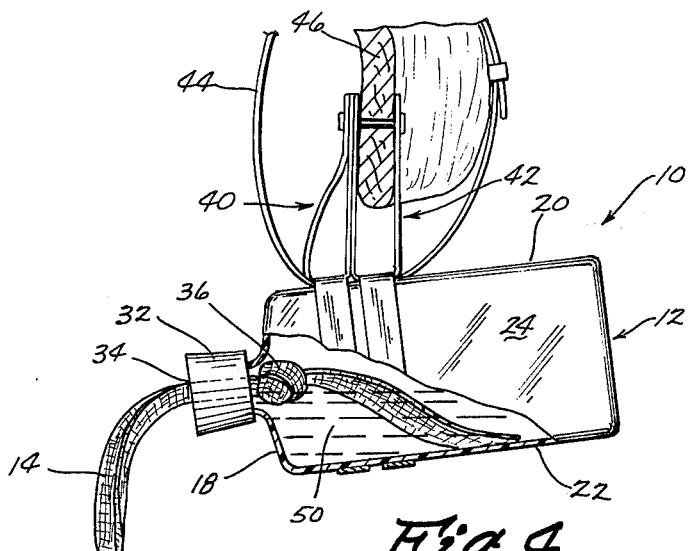
FIG. 4 is an enlarged sectional view taken along line 4—4 of FIG. 1.
Figure 5:
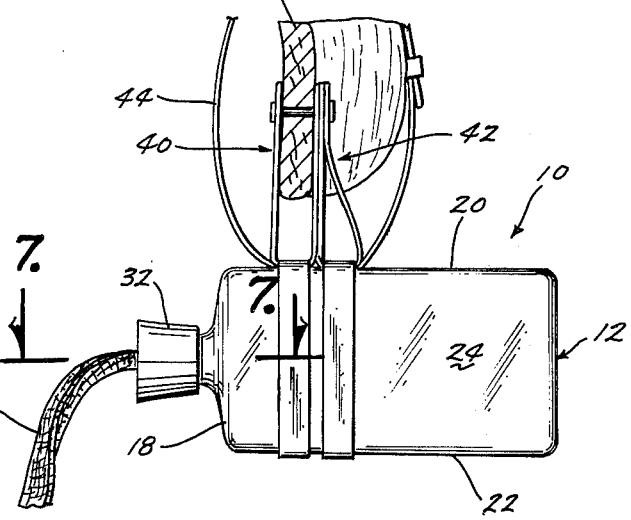
FIG. 5 is a view similar to FIG. 4, but showing the device mounted in a different position with respect to the animal's ear.
Figure 3:
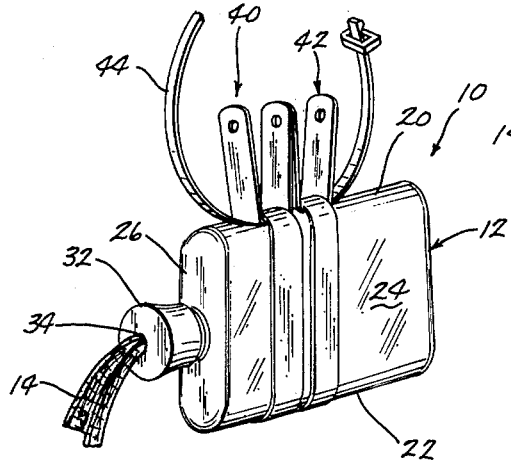
FIG. 3 is a perspective view of the face fly device of the present invention.

In order to secure the device to an animal's head, the animal's ear lobe, designated by the numeral 46 in FIGS. 4 and 5, is positioned within the upstanding elements of either U-shaped tab 40 or U-shaped tab 42. Positioning the lobe between the upstanding portions of tab 40 causes the container to be positioned further rearwardly with respect to the animal's head than would be the case if the animal's lobe 46 were positioned between the upstanding portions of tab 42. The difference in these two relative positions is illustrated in FIGS. 4 and 5. A rivet is then secured through all the upstanding tabs and pierces in the lobe 46 of the animal's ear with little or no pain resulting to the animal. Tie element 44 may then be extended around the animal's ear and tied together so as to provide additional support to the container.

Figure 2:
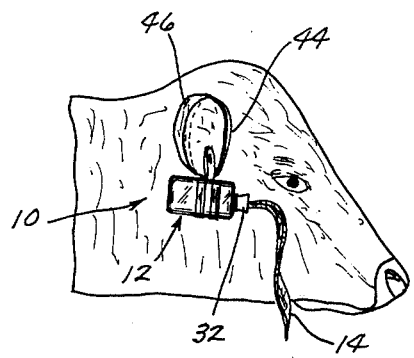
FIG. 2 is a side elevation of the animal of FIG. 1.

When the device is secured to the animal's ear in the manner described above, it will have a position similar to that shown in FIGS. 1 and 2, wherein the container 12 is adjacent the animal's ear, and the wick 14 extends downwardly adjacent the animal's face. Wick 14 has sufficient length so that its lower end terminates just above the animal's mouth. The insecticide 50 within the container travels through the wick so as to dampen the lower end of the wick. As the animal moves, the lower end of the wick rubs against the animal's face and transfers insecticide to the animal's face to repel the face flies.

Knot 36 provides an important function in that it restricts the flow of fluid from the interior of the container downwardly to the lower end of wick 14. In previous devices that did not include knot 36, the fluid would flow quickly down the wick and would often drip from the end of the wick. However. when knot 36 is employed in the manner described above, the lower end of wick 14 remains damp, but does not drip. Furthermore, the fluid within the container lasts for several months without having to be replenished, whereas in previous devices the fluid often had to be replenished within a few days.

The device may be used for different kinds of animals, and may be secured adjacent the animal's face by various means. For example, the device could be secured to a halter or bridle of a horse in such a manner that the wick would brush against the horse's face. All of the identification material presently secured to the ears of cows may be placed on the face of the container. Thus, the device serves not only as a face fly repellant, but also as a means for conveniently securing identification material to the animal.

Thus, it can be seen that the invention accomplishes at least all of its stated objectives.

I claim:

1. A face fly device comprising
a container having opposite ends, said container having a compartment area therein for receiving a face fly repellant liquid;
securing means associated with said container for attaching said container to the head of an animal; and
an elongated wick having opposite ends and having a knot intermediate said opposite ends, said knot and one of said ends being within said container for communication with the said fluid, the other of said wick ends extending outside said container and being positioned adjacent said animal's face, whereby said knot restricts the flow of said fluid through said wick while at the same time permitting said other end of said wick to remain damp with fluid from the interior of said container.

2. A device according to claim 1 wherein said wick has an elongated flat shape, said wick being folded to a double thickness along its length prior to the typing of said knot.

3. A device according to claim 2 wherein said wick is exposed to a tension of approximately 50 pounds after said knot is tied.

4. A device according to claim 2 wherein said wick extends through an opening on one of the walls of said container.

5. A device according to claim 4 wherein said opening is surrounded by an annular threaded neck, a cap being threaded thereon, said cap having a slot therein for receiving said wick.

6. A device according to claim 4 wherein said knot is larger than said opening and engages the annular margins of said opening on the interior of said container.

* * * * *